United States Patent [19]

Barkatt et al.

[11] Patent Number: 4,648,975

[45] Date of Patent: Mar. 10, 1987

[54] PROCESS OF USING IMPROVED SILICA-BASED CHROMATOGRAPHIC SUPPORTS CONTAINING ADDITIVES

[75] Inventors: Aaron Barkatt, Silver Spring, Md.; Pedro B. Macedo, 6100 Highboro Dr., Bethesda, Md. 20817

[73] Assignees: Pedro B. Macedo, Bethesda; Theodore A. Litovitz, Annapolis, both of Md.

[21] Appl. No.: 833,263

[22] Filed: Feb. 27, 1986

Related U.S. Application Data

[63] Continuation-in-part of Ser. No. 523,853, Aug. 17, 1983, abandoned.

[51] Int. Cl.$^4$ ............................................. B01D 15/08
[52] U.S. Cl. ................................. 210/656; 210/198.2; 210/502.1; 502/240; 502/242; 502/250; 502/256; 502/258; 502/263; 502/407; 502/411; 502/439
[58] Field of Search ............. 210/656, 635, 198.2, 210/198.3, 502.1; 502/242, 250, 256, 258, 240, 263, 404, 406, 407, 411, 412, 439; 55/67, 386; 427/215, 220, 221

[56] References Cited

U.S. PATENT DOCUMENTS

| | | | |
|---|---|---|---|
| 2,267,831 | 12/1941 | Liebknecht et al. | 210/23 |
| 3,677,938 | 7/1972 | Le Page et al. | 210/31 |
| 3,701,678 | 10/1972 | Rossler | 210/198.3 |
| 3,722,181 | 3/1973 | Kirkland et al. | 55/67 |
| 3,843,341 | 10/1974 | Hammel et al. | 65/22 |
| 3,869,409 | 3/1975 | Bebris | 210/656 |
| 3,923,688 | 12/1975 | Hammel et al. | 252/432 |
| 4,034,139 | 7/1977 | Mazarguil | 210/656 |
| 4,138,336 | 2/1979 | Medel | 210/198.2 |
| 4,140,653 | 2/1979 | Imura | 210/198.2 |
| 4,159,966 | 7/1979 | Roberts | 210/198.2 |
| 4,178,270 | 12/1979 | Fujita et al. | 252/447 |
| 4,224,189 | 9/1980 | Scholten | 502/439 |
| 4,257,938 | 3/1981 | Hosoi | 210/656 |
| 4,299,732 | 11/1981 | Ball et al. | 252/455 R |
| 4,322,310 | 3/1982 | House | 252/184 |
| 4,332,031 | 5/1982 | Barkatt et al. | 376/313 |
| 4,333,847 | 6/1982 | Tran et al. | 252/629 |
| 4,335,017 | 6/1982 | Miles | 210/656 |
| 4,340,496 | 7/1982 | Abbott | 252/184 |
| 4,359,389 | 11/1982 | Heine | 210/644 |
| 4,430,496 | 2/1984 | Abbott | 210/656 |
| 4,431,546 | 2/1984 | Hughes | 210/656 |

FOREIGN PATENT DOCUMENTS

WO85/00758  2/1985  PCT Int'l Appl. ................ 210/656

OTHER PUBLICATIONS

Jackson et al., Ind. Res. Dev., Feb. 1983, pp. 130–133.
Ohta et al., Am. Ceram. Soc. Bull., 57, 602–604 (1978).
Snyder, Introduction to Modern Liquid Chromatography, J. Wiley, New York, 1979, pp. 238–240.
Horvath, "Columns in Gas Chromatography", The Practice of Gas Chromatography, Interscience Publishers, N.Y. (1967), pp. 152–161.
Waters Sourcebook for Chromatography Columns and Supplies, Millipore Corporation, Mar. 1985, pp. 1–29.
Hammers, W. E., et al., "Standardization and Determination of the Selectivity of Octadecylsilylsilica in High--Performance Liquid Chromatography", Journal of Chromatography, 167, 273–289 (1978).

*Primary Examiner*—Ernest G. Therkorn
*Attorney, Agent, or Firm*—Fleit, Jacobson, Cohn & Price

[57] ABSTRACT

Silica-based chromatographic and reactive materials are disclosed with surfaces modified to contain or to be coated with oxides, hydrous oxides, hydroxides, carbonates or silicates of aluminum, iron, or other suitable metals such as zirconium or titanium. The materials exhibit good resistance to dissolution and resulting loss of activity or clogging. This good resistance is particularly evident even in the high pH region (above 8–9) and in the high temperature region (above 35° C.) where the dissolution rates and solubilities of aluminosilicates and of trivalent iron oxides are much smaller than those of silica.

3 Claims, No Drawings

PROCESS OF USING IMPROVED SILICA-BASED CHROMATOGRAPHIC SUPPORTS CONTAINING ADDITIVES

This is a continuation-in-part of application Ser. No. 523,853, filed Aug. 17, 1983, now abandoned.

BACKGROUND OF THE INVENTION

Various forms of silica and silica-based chromatographic materials are of primary importance in separating fine organic and biochemical products from one another, from by-products and from excess reagents in reaction mixtures. For instance, silica of various particle sizes (e.g., 1 to 700 $\mu$m) and pore diameters (e.g., 1 nm to 1 $\mu$m) is used in a very large fraction of the high-pressure liquid chromatographic separation techniques ("HPLC") in use. For certain applications (e.g., affinity chromatography) active groups which exhibit different degrees of interaction with different components of a mixture to be separated are coated on or bonded to the silica surface, usually by means of using organo-silane reagents. A particular class of modified silica-based chromatographic supports are controlled pore glass supports, which are coated with polar groups such as quarternary amine or sulfonic glycophases for use in ion-exchange chromatography. Controlled pore glass supports are also widely used in exclusion and affinity chromatography. On the other hand, despite the availability of a large variety of silica supports coated with various functional groups and molecules, materials consisting of largely pure silica are used in a large number of separations. For instance, silica gel is the most widely used support in high pressure liquid chromatography. Molecules separated on pure and coated silica surfaces include amines, amino acids, purines, nucleosides, nucleotides, aminoglycosides, peptides, proteins, nucleic acids, enzymes and other organic and biochemical molecules as well as inorganic species such as metal ions and anions.

In addition to their role in separations, silica-based supports are also used in carrying out chemical reactions using reagents which are immobilized on the grain and pore surfaces. Such reactive supports include, for instance, reducing supports to which reducing groups such as borohydride have been attached, supports which contain chelating groups to remove metal ions from solutions, and supports which contain immobilized enzymes and other biochemically active species.

In spite of their wide usefulness, silica-based supports are subject to a number of limitations. These are evident in some cases more than in others. For instance, uncoated silica supports are more susceptible to deterioration at high pH than supports coated with neutral molecules, and coarse-grained, large-pore glass supports are more durable than fine-grained, small pore gels. However, the problems encountered in the case of silica gels used for high-pressure liquid chromatography, for instance, also appear in the cases of other silica-based supports, although their extent may be smaller or they may appear after a longer period of service.

One serious problem which limits the application of silica supports is the poor durability of silica at the high pH range. Generally, mixtures of organic or biological molecules are separated by sorption on a support followed by fractional elution using eluants with varying combinations of pH and ionic strength. High pH separations are very useful in the case of proteins and other substrates. However, at pH values above 7.5 rapid silica dissolution takes place, leading to loss of activity of surface sites and to clogging due to reprecipitation at the lower parts of the column. Support deterioration becomes much more serious at elevated temperatures.

Jackson and Fisher (Ind. Res. Dev., Feb. 1983, pp. 130–33) state: "For a silica-based bonded phase, the packings are stable in the pH range of 2.0 to 7.5 Exposure to a mobile phase with a pH higher than 7.5 (less acid) causes dissolution of the silica and leads to voids in the column. The resulting chromatogram will exhibit peak broadening, and thus a loss of resolution, sensitivity (as the peak broadens, the peak height decreases, decreasing the sensitivity), and quantitative accuracy. We need to note also that a sample of high pH can cause void formation at the column head as it is introduced onto the column. This effect can be observed regardless of the pH of the column. Of course, an occasional run outside the pH range, 2.0 to 7.5, can be acceptable. But, frequent operation outside the range results in both poor chromatography and greatly reduced column life". In addition to poor column performance and short lifetime, the enhanced silica dissolution at pH values above 7.5 also causes considerable contamination of the separated products with silica. One way to overcome the problems associated with the use of silica columns at high pH environments, mentioned by Jackson and Fisher, is to replace such columns by resin-based, usually polystyrene/divinylbenzene, stationary phases. However, these materials have poor mechanical properties and are crushed at the high pressures required in typical liquid chromatography operations. Jackson and Fisher also emphasize that "even small changes in pH (e.g., by 0.5 of a pH unit) can have large effects on the shapes of chromatograms". Accordingly, even a small increase in the service range of silica-based stationary phases can result in considerable improvement of existing separation techniques and in making it possible to perform novel separations.

Another problem associated with the use of silica-based supports is the fact that the silanol surface groups often form excessively strong bonding with the organic or biochemical species being purified and this requires the use of drastic conditions (in terms of solvent polarity, pH, ionic strength and temperature) to desorb the molecule of interest. In the case of many sensitive organic structures this leads to decomposition or loss of biological activity (for instance, denaturing of proteins).

A third problem associated with the use of silica supports is due to the existence of various configurations of silicon-oxygen on silica surfaces, including isolated hydroxyl groups, pairs of hydroxyl groups attached to the same Si atoms, pairs of hydroxyl groups attached to adjacent Si atoms, and siloxane (Si-O-Si) terminal groups. Since each of these configurations has a different affinity towards organic substrates, chromatographic peaks are often quite broad and the resolution of separating similar species is poor.

It is well-known that hydrous oxides of various metal ions such as Al and Fe reduce the solubility of silica in water (U.S. Pat. No. 2,267,831) and in aqueous solutions (U.S. Pat. No. 4,332,031). This is due to the formation of a combined species (aluminosilicate, iron oxide-silicate, etc.) which has a very low solubility in water. The interaction involved in the formation of such species may consist of a chemical reaction, sorption, ion-exchange, colloid-colloid neutralization, etc. Furthermore, the rise in solubility with increasing temperature is also smaller in the case of aluminosilicates than in the case of silica. However, according to studies of the chemical durability of silicate glasses in high pH media (Ohta and Suzuki, Am. Ceram. Soc. Bull., 57, 602–604 (1978)), the addition of alumina or iron oxide to the glass results in increased corrosion rates.

U.S. Pat. No. 3,843,341 relates to thermally, stable, mechanically strong microporous glass articles with large pore volumes, surface areas, and varying pore sizes, and methods for making such articles. In particle form, such as beads, the microporous glass articles are useful as catalyst supports in applications such as petroleum catalytic refiners and motor vehicle catalytic mufflers. The mechanical strength and the dimensional stability of the microporous glass articles at elevated temperatures can be improved if the articles are pre-shrunk, such as by brief exposure to high temperatures, before their intended use, and can be improved even further if treated with certain metal oxides. In particular, this improvement is achieved by treating the preshrunk porous glass article with a tin solution to deposit tin oxide thereon. The deposition is effected through soaking in a tin chloride solution, drying and calcination at 700° C. A similar procedure is used with other metals such as aluminum and zirconium. The deposition of the metal salt occurs during the initial drying stage performed at 100° C. This causes the deposition to take place through thermal precipitation as water is evaporated rather than through sorption on the glass surface. Furthermore, the metal salt solutions used, such as solutions of tin chloride, aluminum nitrate, and zirconium oxychloride, are highly acidic and accordingly they are not suitable for sorption of the metal ion upon contact with the porous glass surface. However, tin oxide ($SnO_2$) is a particularly desirable metal oxide to deposit on the porous glass articles of the invention. Tin oxide has been found to provide additional thermal stability to the porous glass bead. According to the patent, this is somewhat surprising in that other metal oxides such as $Al_2O_3$, $Cr_2O_3$ and $ZrO_2$ do not provide analogous results and do not show improved stability over the undoped glass.

The amount of tin oxide deposited within the pores according to this patent should be about 0.5 to 10 percent, preferably about 1 to 5 percent by weight. The metal oxide doping levels shown in this patent are 1.5% $SnO_2$, 1% $Al_2O_3$, 1.5% $Cr_2O_3$, 3.0% $ZrO_2$ and 3% $CuO$-$Cr_2O_3$, respectively. In all cases, the metal oxide deposition treatment follows a high-temperature preshrinking step to produce a porous glass article with improved stability in high-temperature applications.

U.S. Pat. No. 3,923,688 is a continuation-in-part of the previous patent. It details the preparation of the microporous glass articles having a catalytic coating deposited thereon, where the catalyst is a metal oxide selected from the class consisting of $TiO_2$, $V_2O_5$, $Cr_2O_3$, $FeO$, $CoO$, $NiO_2$, $CuO$, $Al_2O_3$, $ZrO_2$ and $SnO_2$. It also mentions the possible uses of the thermally stable porous glass of the invention as an ion exchange and desalination medium, as a chromatographic support, a filter for gases and vapors and as a membrane providing an effective diffusion barrier for use in ultrafiltration and reverse osmosis. In these applications, the patent notes that porous glass offers expanded capabilities for use in systems employing high temperature and low pH which are generally not compatible with organic polymer membranes.

U.S. Pat. No. 4,178,270 describes an inorganic ion-exchanger supported on a carrier which is prepared by supporting an active component of inorganic ion exchanger, such as hydrous oxide of metal, for example, titanium, zirconium, etc., on a porous carrier such as alumina, silica, or activated carbon, where the pH of a solution in contact with the active component and the carrier is adjusted so that the active component and the carrier can have zeta potentials of opposite polarities to each other, and an inorganic ion-exchanger having a larger amount of the supported active component and firmly supporting less bleedable active component can be obtained by setting out a supporting condition on the basis of the polarity of zeta potential. This patent describes the preparation of supported hydrous titanium and zirconium oxides, but the possible use of the hydrous oxide of titanium in admixture with manganese, zinc, tin, zirconium, silicon or rare earth elements is also mentioned. According to the invention described in the patent, the carrier supports about 10% by weight of the hydrous metal oxide in the hydrolyzed state, on the basis of the carrier, and at least 5% by weight thereof, even after shaking. This invention does not describe a chromatographic material. It specifically describes an ion-exchanger suitable for recovery of useful resources in sea water, removal of impurities from high temperature boiler water in nuclear reactors or industrial boilers, removal of impurities in industrial waste water, etc. In this invention alumina is considered as a carrier rather than as a potential dopant.

U.S. Pat. No. 4,333,847 relates to the immobilization of toxic, e.g., radioactive materials, internally in a silicate glass or silica gel matrix for extremely long periods of time. Toxic materials, such as radioactive wastes containing radioactive anions, and in some cases cations, which may be in the form of liquids, or solids dissolved or dispersed in liquids or gases, are internally incorporated into a glass matrix, having hydrous organofunctionalsiloxy groups, e.g., hydrous aminoalkylsiloxy or carboxyorganosiloxy, bonded to silicon atoms of said glass and/or hydrous polyvalent metals bonded to silicon atoms of said glass through divalent oxygen linkages or otherwise immobilized therein, by a process which involves the ion exchange of said toxic, radioactive anions with hydroxyl groups attached to said organofunctionalsiloxy groups or with hydroxyl groups attached to the hydrous polyvalent metal. In the case where hydrous polyvalent metals are used, said nonradioactive cationic polyvalent metals are selected from the group consisting of $-Zr^{3+}$, $-Pb^+$, $-Th^{3+}$ and $-Ti^{3+}$. The processes described in the patent for attaching said metals to the glass consist of cation exchange with protons or molecular stuffing, which lead to loading the glass with high concentrations of hydrous oxides of said metals.

U.S. Pat. No. 3,677,938 relates to a chromatographic separation process using columns filled with porous silica. The porous silica used in the columns is prepared by calcination of silica gel at temperatures within the range of 400° to 1000° C. The silica gel used in the calcination is doped with foreign atoms including alkali metal cations (lithium, sodium, potassium and cesium) and acid anions (sulfate, phosphate, bromide, chloride and iodide). This formulation makes it possible to obtain substantially complete dehydration of the silica upon calcination, leading to enhanced mechanical strength and stability of the silica gel particles.

U.S. Pat. No. 3,722,181 relates to a process for making a chromatographic packing having a polymeric stationary phase comprising repeating units of silicon. The organic stationary phase is bonded to a substrate which contains a metal or a metal oxide where the metal has a valence of 3–5, including non-alkaline metal oxides, alumina, thoria, titania, zirconia and non-alkaline metals with an oxide skin. However, the preferred substrates are those which contain silica, such as diatomaceous earth, silica gel, glasses, sand, aluminosilicates, quartz, porous silica beads and clays. The purpose of the introduction of Si or a polyvalent metal into the substrate surface is to provide for the formation of linkage with the polymolecular organosilicon stationary phase.

U.S. Pat. No. 4,299,732 relates to amorphous aluminosilicates which are useful as catalysts. It describes the preparation of synthetic amorphous aluminosilicates by mixing under reaction conditions a source of silica such as an aqueous colloidal dispersion of silica particles, a source of alumina such as sodium aluminate prepared by dissolving alumina particles in excess sodium hydroxide solution, a source of alkali metal such as sodium hydroxide, water and one or more polyamines other than a diamine. The reaction conditions are a temperature in the range 80° to 210° C., a pressure in the range of 70 to 400 psig and a reaction time in the range 20 to 100 hours. The exact formulation of the aluminosilicate and the specific method of preparation have a large effect on the catalytic properties of the surface of aluminosilicate solids.

U.S. Pat. No. 4,322,310 relates to a composition comprising a chiral organic amine covalently linked via a carbamate, mercaptocarbamate, or urea linkage to a chain of atoms which in turn are covalently bound to a core support. The support described in the patent is used as a solid phase chromatographic medium in the separation of racemic mixtures. This patent illustrates, for example, the binding of a silyl group to an alumina support and having an alpha-methylbenzyl amine molecule bound through a carbamate linkage to said 3-propyl-silyl group. In general, supports mentioned in this patent include silica, alumina, glass and ceramic materials, and silylating agents are used to form a covalent bonding to the chiral composition.

U.S. Pat. No. 4,340,496 relates to an anion exchange composition that is useful in chromatographic separations comprising an inert porous particle having a tetrasubstituted silane material fixedly attached by covalent bonding to the surface thereof. This patent demonstrates the use of the resulting weak anion exchange material in separating polar polyfunctional compounds such as proteins. The inert porous particle to which the silane material is attached is microparticulate silica in all the examples cited in the patent. The possible use of alumina, cross-linked dextran and cross-linked polystrene-divinylbenzene as inert porous particles is also mentioned.

U.S. Pat. No. 4,359,389 relates to the purification of human fibroblast interferon using a two-stage purification method comprising (a) subjecting an aqueous interferon solution to chromatography on porous glass beads and (b) subjecting the resulting aqueous interferon solution to chromatography on immobilized zinc chelate. The porous glass beads used in the first stage are of controlled (i.e., rather uniform) pore size between 170 and 1700 Å (usually between 350 and 900 Å) and a diameter which may be less uniform and may range in general between 50 and 500 $\mu$m. The beads are used to absorb the interferon from an aqueous solution having a neutral or slightly alkaline pH (around 7.4), and the interferon is eluted using an elution agent at acidic pH (6 to 4) and subjected to the second stage of purification by means of immobilized zinc chelate.

Accordingly, it is an object of the present invention to provide an improved silica-based support.

A further object of the present invention is to provide a silica-based chromatographic or reactive support which is relatively free from deterioration at high pH or high temperature.

Yet a further object of the present invention is to provide a silica-based support which has good durability of silica at high pH or high temperature.

Another object of the present invention is to provide a silica-based chromatographic support for bonding organic or biochemical species in which the molecules can be desorbed without substantial decomposition or loss of biological activity.

Another object of the present invention is to provide a silica-based chromatographic or reactive support which minimizes product contamination with silicate during separation of mixtures or chemical reaction.

Yet another object of the present invention is to provide a silica-based chromatographic support which provides good resolution of separating similar species.

Another object of the present invention is to provide a method whereby a chromatographic support can be improved, for instance, to have a higher stability at high pH or high temperatures, without adversely affecting the flow characteristics or the chromatographic resolution of the support material.

Another object of the present invention is to provide a durable reactive silica-based support which can be used at high pH or at high temperature or both.

Another object of the present invention is to provide a method for making a corrosion-resistant porous siliceous article which can be used as a support for a dye, an enzyme or a dye-enzyme combination in a sensor device for measuring chemical or physical properties in aqueous media over significant time periods.

SUMMARY OF THE INVENTION

In accordance with the present invention, silica-based chromatographic materials are provided with surfaces modified to contain or to be coated with oxides, hydrous oxides, hydroxides, carbonates or silicates of aluminum, iron, or other suitable metals such as zirconium or titanium. The materials exhibit good resistance to dissolution and resulting loss of activity or clogging. This is especially true in the high pH region (above 8–9) or high temperature region (above 35° C.) where the dissolution rates and solubilities of aluminosilicates and of trivalent iron oxides are much smaller than those of silica.

In addition, the modification of silica surfaces with metal species such as aluminum or iron is believed to lead to reduction of the polarity of surface groups and their binding strength with respect to organic species. Accordingly, it is believed that the separations of proteins, enzymes, etc. can be carried out under milder elution conditions without risking denaturing. Furthermore, such surface modification will reduce the non-uniformity of surface structures by preferential attachment to the more reactive silanol groups, resulting in narrower elution peaks and sharper resolution. Optimization on the choice of additives can lead to systematic tailoring of the reactivity and surface charge for specific purifications. The improvements resulting from the present invention should be most advantageous when combined with the use of siliceous materials with sharp pore size distribution such as controlled pore glasses. Modification of surface compositions with additives can be accomplished during the preparation of silica-based support materials or by means of subsequent treatments (e.g., contact with solutions which contain the additive).

Experiments have shown that treatment of siliceous support materials to incorporate alumina or iron oxide in the surface reduce the amount of corrosion and the occurrence of clogging during subsequent passage of high pH solutions or high temperatures without affecting the performance of the column in the separation of organic materials. As such, the present invention clearly represents a marked advance over the state-of-the-art discussed above.

Experiments have further shown that when such treatment of siliceous support materials to incorporate metal oxides such as alumina or iron oxide in the surface are carried out by sorption of the dopant from an unsaturated or saturated solution the treatment does not result in a significant adverse effect on the flow characteristics or chromatographic resolution of the column. This is a major improvement, as pertaining to chromatographic support materials, over the use of precipitation methods previously proposed for coating a porous carrier with inorganic species. Precipitation methods, such as those described in U.S. Pat. No. 4,178,270, based on the hydrolysis of a metal oxide near a surface or in the pores of a carrier, have been shown in parallel experiments to cause a very large decrease in chromatographic resolution when applied to materials used in chromatographic applications.

In addition to siliceous chromatographic support materials, the modification of silica surfaces with metal species provides a method for enhancing the corrosion resistance of reactive supports such as porous siliceous materials to which dyes, enzymes or other reactive groups are attached. This makes it possible, for instance, to use small porous silica-based dye or enzyme systems in optical sensors to monitor chemical or physical changes in the environment of the sensor.

DESCRIPTION OF THE PREFERRED EMBODIMENTS

The silica-based material employed in accordance with the present invention can be any of the silica-based materials conventionally employed as chromatographic supports in liquid chromatography, particularly high-pressure liquid chromatography and ion-exchange chromatography. Suitable silica-based materials are porous glass and silica gel. Suitable porous glass compositions are described in U.S. Pat. No. 3,549,524. The porous glass medium described in U.S. Pat. No. 3,549,524 has a controllable pore size of narrow distribution and is prepared from a base glass having a composition which lies in a limited region of the ternary system $RO.B_2O_3.SiO_2$ wherein the region comprises compositions which will separate by heat treatment into at least two phases, one of which is easily decomposable and the other substantially undecomposable. The term RO in U.S. Pat. No. 3,549,524 is defined to mean any of the alkaline earth, alkali metal or heavy metal oxides wherein RO can be $Li_2O$, $Na_2O$, $K_2O$, CaO, BaO, MgO, BeO, SrO, ZnO or PbO, or any combination thereof. The base glass composition can be of the type described in U.S. Pat. Nos. 2,106,744 and 2,215,039. Suitable mixtures of oxides include compositions wherein the base glass silica is present in amounts ranging from 50 to 83 weight percent, the RO (e.g., soda, potash, lithia) is present in amounts ranging from about 2 to 10 weight percent and the boric oxide is present in amounts from about 8 to 48 weight percent. The processing of the base glass is fully described in U.S. Pat. No. 3,549,524, the disclosure of which is expressly incorporated herein by reference.

The literature also adequately describes the preparation of silica gel compositions which can be employed in this invention. These materials are commercially available, for example, from Sigma Chemical Co., St. Louis, Mo.

The silica-based support is modified to contain or be coated with oxides, hydrous oxides, hydroxides, carbonates or silicates of a suitable metal. The preferred metals are aluminum and iron. However, chromium, tin, lanthanum, rare earths, alkaline earths, zinc, hafnium, thorium, gallium and, in particular, zirconium or titanium can also be used. Preferably, the support is contacted with a suitable metal salt dissolved in an aqueous medium having a pH of above about 2. The pH of the aqueous medium is typically about 2 to 9 and preferably about 3 to 7.5. During the contact, the support is modified to contain or to be coated with the oxide, hydrous oxide, hydroxide, carbonate or silicate of the metal. The modification of or coating of the support can, in some cases, be controlled by changing the pH of the solution to precipitate the metal. In other cases, the coating can be produced by sorption of the metal species from a solution at a constant pH.

Among the two methods outlined here, viz. precipitation and sorption, precipitation (exemplified by the procedures reported in U.S. Pat. No. 4,178,270) has distinct disadvantages in preparing chromatograhic support materials.

The method of U.S. Pat. No. 4,178,270 is based on the precipitation of a low-solubility compound of a metal ion near a surface of, or in the pores of, a porous carrier. For instance, a metal salt may be hydrolyzed to form a hydrous metal oxide in a pH range which allows the zeta potentials of the carrier and of the hydrous metal oxide to have opposite polarities to each other. This process provides a method for supporting a large amount of the precipitated hydrous metal oxide (at least 5%, typically about 10%) on the porous carrier, according to U.S. Pat. No. 4,178,270. The object of the invention described in U.S. Pat. No. 4,178,270 is to support a large amount of a hydrous metal oxide on a carrier to provide a large concentration of the active ingredient (the hydrous oxide) for irreversible ion-exchange applications which do not require accurate control of the flow characteristic or the chromatographic resolution of the material. However, the use of such precipitation methods leads to a high degree of coverage of the surface of the original support with aggregate of colloidal particles of the precipitated species, e.g., hydrous metal oxide. This causes effective masking of the original active sites, neutralization of the original surface charge, changes in particle geometry due to massive, irregular coating, flocculation of coated particles and at least partial clogging of pores. Similar problems arise when other methods of bulk precipitation, such as thermal deposition through the evaporation of water from a solution of a metal salt, are used.

On the other hand, the preferred method according to the present invention is based on sorption of the metal species. According to this method, the concentration of the metal species in the liquid (usually aqueous) medium which is brought in contact with the support does not exceed, or does not significantly exceed, its solubility in said medium. Thus, the solution is unsaturated or saturated but is not oversaturated. Specifically, the solution by itself does not spontaneously precipitate in either crystalline or colloidal form the metal species within a time period equal to the sorption contact time. Precipitation induced by drying is prevented by rinsing the porous glass or silica gel prior to drying or by adjusting the volume and concentration of the metal solution to ensure substantial depletion of the metal ion from the solution through sorption prior to drying. The pH of the metal solution is chosen so as to permit a significant amount of sorption. For instance, concentrated acid solutions are not used. This sorption process may involve physical adsorption, chemisorption or both. For instance, one mechanism which may be involved in, but does not restrict, the present invention, is the sorption of a metal ion, such as a hydrated aluminum ion, onto a silicate site on the surface. After drying, this silicate site retains the metal ion in the form of an attached oxide or hydroxide molecule. Another mechanism is a chemical reaction between the silicate site and the metal ion to form a distinct complex entity such as an aluminosilicate species. Such physical or chemical sorption processes provide for a surface coverage not exceeding very few molecular layers, usually not more than a monolayer. Accordingly, this process results in lower loading levels (below 2%, typically below 0.5%) of the dopant, and leaves the geometry and the reactivity of the support grains largely intact. As a result, the doping process based on sorption will not have an adverse effect on the flow characteristics of the chromatographic resolution of a chromatographic column loaded with a porous support powder.

Another distinction between the present invention and the one described in U.S. Pat. No. 4,178,270 is that alumina, found in the present case to be an extremely effective dopant in coating the surface of the porous carrier, is not considered in this role in U.S. Pat. No. 4,178,270, which only refers to alumina as a carrier material.

In the case of iron, it is preferred to dissolve a ferrous salt in the aqueous medium rather than a ferric salt. However, the final coating material is a ferric material, e.g., ferric oxide, due to the oxidation of the ferrous salt during or following modification or coating of the support.

The amount of aluminum, iron, zirconium, titanium, chromium, tin, lanthanum, rare earth, alkaline earth (e.g., calcium, magnesium), zinc, hafnium, thorium or gallium metal immobilized on the support is generally about 0.02 to 5 percent by dry weight, preferably about 0.02 to 2 percent, and more preferably about 0.05 to 0.5 percent, expressed as the metal oxide. The amount of metal immobilized on the support expressed as its oxide is determined by drying the modified support, weighing the support, immersing the support in a strong (other than hydrofluoric) acid at room temperature for about 10 minutes, removing the sample from the acid, determining the metal content of the acid, drying the sample, and measuring the weight loss of the sample. The amount of metal immobilized on the support expressed as its oxide is computed by dividing the metal content of the acid by the dry weight of the sample prior to immersion in the acid. The sample should not have more than 5% weight loss on immersion in the acid.

The specific test which is preferred for determining the concentration of the metal expressed as its oxide in the modified support comprises washing a quantity of glass or silica gel with a small amount of cold water; drying the sample overnight at about 110° to 120° C.; weighing accurately about 0.1 g of sample; stirring the sample with about 3 ml of about 6 molar nitric acid for about 10 minutes at room temperature; decanting the nitric acid and adding to the solid another about 3 ml of about 6 molar nitric acid; stirring for about 10 minutes at room temperature; decanting the nitric acid and mixing it with the first decanted portion; analyzing the sample for aluminum or other additives.

A preferred method of modifying the support is to treat a material such as porous glass, silica gel or other suitable silica-based support material with a solution of a metal species such as aluminum chloride or iron sulfate without subsequent changes in pH to coat the support material with the corresponding metal oxide, hydrous oxide, hydroxide, carbonate or silicate, and provide a support material modified with the desired concentration of metal. The support material can be subsequently packed into a column, made into a stationary or fluid bed or used in other suitable configurations to effect a chromatographic separation or a chemical reaction.

While we do not intend to be bound by this description, we believe that the support into which aluminum, iron, zirconium or titanium has been introduced is characterized by a high concentration of metal oxide on the surface of the pores of the support. It is further believed that the concentration of the metal oxide gradually decreases from the surface of the pores so that a gradually decreasing concentration gradient is created. On the other hand, it must be recognized that leached glass may inherently contain aluminum. However, the aluminum content is not at the surface of the pores, but rather in the interior of the glass matrix. The modification of the standard leached glass in accordance with the present invention provides a high concentration of aluminum at the surface of the pores but this is not believed to greatly effect the concentration in the interior of the matrix. This high surface aluminum content can be specifically determined by using the acid leaching test described above for determining the concentration of metal oxide in the modified support. This acid leaching test does not substantially leach aluminum from the interior of the matrix which is inherently present in a standard leached glass. Thus, the acid leaching test only determines the quantity of aluminum or other additive added by way of the special processing techniques of the present invention.

The modified support of the present invention can be used as a chromatographic support to separate all of the various materials which have previously been separated on conventional silica-based chromatographic materials. In particular, the modified support of the present invention can be used as a chromatographic support for separating amines, amino acids, purines, nucleosides, nucleotides, aminoglycosides, peptides, proteins, nucleic acids, enzymes and other organic and biochemical molecules. The silica-based material typically has a mesh size of about 10 to less than 325 mesh (U.S. Standard Sieve) and preferably a mesh size of about 50 to 200. The pore size typically ranges from about 1 nm to 1 μm and preferably about 2 nm to 200 nm. The silica-based supports of the present invention exhibit resistance to dissolution and clogging in the high pH regions above 7.5, especially above 8.5. Resistance to dissolution and clogging has been found to exist at pH's as high as 10. In general, a chromatographic column should perform well for about one month or longer at a pH up to about 7.5 and a lifetime of one day is considered to be useful. A chromatographic column packed with the modified support of the present invention has been found to function for at least about a month at pH's well above 7.5. Thus, the modified support of the present invention shows exceptional resistance to dissolution and clogging at high pH.

Since silica solubility and dissolution rates start to increase significantly around pH 7.5 and become progressively more severe at increasingly higher pH values, treatment according to the present invention is useful for any solutions which have pH values above 7.5 and becomes more useful the higher the pH value. Thus, it is possible to operate a conventional, untreated silica glass or silica gel HPLC column or reactive support for limited periods of time up to pH 8, or even at pH 8.5. However, the treatment according to the present invention greatly extends the lifetime of such silica glass or silica gel columns in corrosive environments. At pH values above 9, untreated silica columns become unusable because the time scale of silica corrosion approaches the time scale required for chromatographic separations. In such cases, the treatment according to the present invention is essential for the use of such silica glass or silica gel columns. Silica corrosion is an even greater problem when it is desired to carry out chromatographic operations at elevated temperatures, since elevated temperatures raise silica solubility and strongly increase the dissolution rates. At progressively higher temperatures the pH range over which the treatment according to the present invention is necessary to protect the chromatographic support becomes larger, extending to lower pH values. According to the examples below, even at pH 10 and 80° C., it is possible to use silica gel treated according to the present invention as a chromatographic support in HPLC without any observable deterioration for at least 18 hours; under the same conditions, an untreated silica gel column begins to show severe deterioration within approximately 5 minutes and becomes completely clogged within approximately 30 minutes. These considerations apply both to chromatographic and reactive supports based on silica glass or silica gel.

It is often useful or desirable to operate reactive columns, for instance, at high temperatures, ranging above approximately 80° C. At such temperatures, treatment according to the present invention is necessary even when operating with solutions which have pH values below 7.5. Thus, treatment of silica glass or silica gel according to the present invention is useful at a temperature of 25° C. at pH levels above 7.5, preferably between 8.5 and 11; at 35° C. at pH levels above 5, preferably between 7.5 and 11; and above 80° C. at pH levels above 5, preferably between 6 and 10. Thus, it is possible to define corrosive conditions with respect to the operation of silica glass or silica gel materials as conditions which involve pH values above 7.5 or temperatures above 25° C. or both.

As mentioned above, both uncoated silica gel or glass and such gels or glasses coated with or bonded to organic functional groups are used as stationary phases in chromatographic separations. The latter are described, for instance, in U.S. Pat. No. 4,340,496, which describes a microparticulate silica gel coated with N-2-aminoethyl-3-aminopropyl trimethoxysilane to produce N-2-aminoethyl-3-aminopropyl silyl groups covalently chemically bonded to the surface of the silica gel. The present invention can be used to produce stationary phases consisting of silica gel or glass supports with, as well as without, coating with organic functional groups. According to the present invention, silica glass or silica gel supports are treated with a metal dopant to improve their stability before or after the support is silanized and coated with the organic stationary phase. Preferably, the treatment with the metal dopant follows organic coating. According to the examples below, supports produced in this manner are effective in separating components of mixtures when used in a HPLC column.

Furthermore, the modified supports of the present invention are not restricted to stationary phases to be used in chromatographic separations. Reactive supports, such as materials to which reducing, chelating or enzymatically active species are attached can also be made using the present invention to have high stability, in particular in high pH environments. The use of such supports results in reduced dissolution, less contamination, improved reaction selectivity and higher thermal stability.

Reactive supports within the scope of the present invention can include supports with or without attached functional groups which actively convert, or accelerate the conversion, of a reactant or a mixture of reactants into desired product, as well as supports, usually with attached functional groups, which exhibit a chemical change in response to changes in environment. The latter type of materials are useful in monitoring and measuring devices. In particular, the present invention is useful in passivating and stabilizing sensor devices based on silica glass or silica gel. Once such type of device is a porous glass article on which a dye, an enzyme or a combination of a dye and an enzyme is immobilized. Such an article can be used as a sensor or as an enzymatic reagent. For in vivo sensor applications, such elements often need to be very small, typically about 1 mm long, 0.25 mm in diameter and weighing about $10^{-4}$ g. Since the solubility of silica in water, even at neutral pH and at room temperature, is above $10^{-4}$ g/mL, such an article can completely dissolve in 1 mL of water. The rate of dissolution is high because of the large exposed surface area which the article has because of its high porosity. Moreover, dissociation of the dye or enzyme from the surface requires only corrosion of the outermost silica layer rather than of the entire article. A small amount of leakage of dye or enzyme is sufficient to prevent the article from being useful as a more precision measurement device. The corrosion problem is even more serious at temperatures above ambient or at pH values above neutral.

Accordingly, it is very important to increase the chemical durability of the porous siliceous article. The present invention provides a method of accomplishing this enhancement in corrosion resistance by contacting the porous article with a solution of aluminum, iron, zirconium, titanium, chromium, tin, lanthanum, rare earth, alkaline earth, zinc, hafnium, thorium or gallium as detailed above.

This treatment can be applied prior to, in the course of, or subsequent to the attachment of a dye or an enzyme to the porous article. A preferred method is to react the porous article first with a silane, often in a non-corrosive organic medium, then with the metal solution, and finally with a dye or an enzyme in a solution which is often aqueous and hence corrosive with respect to the siliceous surface. It is also possible to improve the survivability of the finished article by storing it in a solution containing one or more of the metals listed above.

It is believed to be particularly surprising that the modified supports of the present invention such as the aluminum oxide modified supports do not form colloids. It is also believed to be particularly surprising that a small amount of metal oxide such as aluminum oxide does not materially change the amount of silica leached out of the chromatographic support yet increases the stability of the column and its resistance to clogging by as much as more than 500%. It is also surprising, in view of reported studies that show enhanced corrosion in high pH media in the case of silicate glasses which contain alumina or iron oxide in their bulk composition (Ohta and Suzuki, Am. Ceram. Soc. Bull., 57, 602–604 (1978)), that a surface treatment of silicate-based stationary phases with such oxides contribute to marked improvement in their resistance to high pH corrosion.

The following non-limiting examples further illustrate the invention.

EXAMPLE 1

Two samples of chromatographic grade silica gel (Sigma Chemical Co., St. Louis, Mo., #S-4133, 100 to 200 mesh) were treated with a solution of 16 mg/l Al (present as aluminum chloride) at a pH of 5.5. In each case, a quantity of 8g of silica gel was shaken with a volume of 0.5 l of the solution for 2 days. After washing in water and drying, the modified silica gel was found to contain 0.137% Al in one case and 0.094% Al in the other. Four chromatographic columns were prepared, each with a bed height of about 4.5 cm and a cross-section of 1 cm. Two of the columns were loaded with the original silica gel and two with the Al-modified gel. A 0.005 M pH 10 buffer solution made up with potassium carbonate, potassium borate and potassium hydroxide was used as an influent in all cases. Flow was gravitational under normal atmospheric pressure and the hydrostatic head was 2 m high. The initial flow rate in all cases was adjusted to approximately 0.3 ml/min by means of a stopcock. The two columns loaded with unmodified silica gel clogged up, one after 4.5 hours and the other after 10 hours, and the flow could not be restarted even when the stopcocks were fully opened. The Al-modified columns showed no clogging even after 20 hours. Silica concentrations in the effluent from the unmodified columns after the first 3 hours of flow were 42 and 52 mg/l Si compared with 28 and 37 mg/l Si in the case of the two Al-modified columns. Accqrdingly, the improvement in column durability and performance which occurs upon treatment with a small amount of aluminum species is very noticeable. Further experiments have shown that high-silica porous glass can also be loaded with approximately 0.1% Al upon similar treatment.

EXAMPLE 2

Three batches of silica gel were prepared: (A) a quantity of 7.669 g of 100–200 mesh silica gel (Sigma Chemical Co. S-4133) was slurried with a volume of 20 ml of de-ionized water; (B) a quantity of 7.669 g of the same type of silica gel used in (A) was stirred for three days with a volume of 500 ml of an aqueous solution which contained 20 ml of a solution of 1000 mg/l aluminum in dilute hydrochloric acid, 1.7 ml of 50% w/w aqueous sodium hydroxide, and 24 ml of pH 7 phosphate buffer; (C) a quantity of 7.669 g of the same type of silica gel used in (A) was stirred for three days with a volume of 500 ml of an aqueous solution which contained 5 g of ferrous sulfate heptahydrate and 0.05 g of hydroxylamine hydrochloride. During this time the iron was slowly oxidized by air to the trivalent state as shown by the fact that the silica gel became yellowish brown.

A mixture of three dyes was prepared in a volume of 10 ml of pH 9 borate buffer solution similar to that used in Example 1. The quantities of dyes dissolved in this volume were 0.05 g of xylenol blue, 0.036 g of neutral red and 0.05 g of quinaldine red. The dyes were dissolved in the buffer solution by stirring for 10 minutes.

The three batches of silica gel designated (A), (B), (C) above were each placed in a chromatographic column with a cotton plug. The bed height of each column was 12.5 cm and the volume of each column was 11.8 ml. A volume of approximately 1500 ml of a solution of pH 9 borate buffer (diluted 1:10 in de-ionized water) at a flow rate of approximately 3 ml/min. was used. The hydrostatic head was 165 cm. At the end of this stage, the pH of the effluent of each of the three columns was observed to have stabilized at a value of 9.0. The excess influent above each column was drained off and 3 drops of the mixed dye solution described above were placed just above the top of the column and permitted to flow down into the uppermost part of the column. The flow of the dilute pH 9 buffer solution through the column was thereupon resumed in order to observe the separation of the dyes on the column.

In all three cases, the xylenol orange (colored blue) passed very quickly through the column (about 10 minutes for complete elution). Neutral red (orange-brown) took approximately two hours to pass through the column. Quinaldine red (bright red-purple) remained at the top of the column and moved downwards at a rate of only about 1 mm/hr. The behavior of the dyes on the three columns was identical. However, the flow characteristics were quite different. The untreated silica gel column (A) was observed to clog, and the stopcock below the column had to be adjusted every few minutes in order to re-adjust the flow rate to its original level of 3 ml/hr. This column became completely clogged at the end of two hours and flow could not be continued even with the stopcock open all the way. The iron oxide-treated silica gel column (B) showed little clogging during the initial 10-hour period, but after being permitted to stand for 30 days in contact with the influent, the flow slowed down appreciably and it was necessary to open the stopcock all the way in order to maintain the flow. The alumina-treated silica gel column (C) did not exhibit any clogging or slowing down of flow even after 30 days.

The test showed that the iron oxide treatment and, in particular, the alumina treatment greatly enhanced the chemical stability and flow characteristic of the silica gel columns in high pH environments without impairing the chromatographic resolution exhibited by the columns.

EXAMPLE 3

In this Example the chromatographic efficiency of HPLC columns packed with a silica powder treated according to the present invention by sorption of aluminum moieties from solution was measured and compared with that of a powder coated with precipitated hydrous aluminum oxide and with that of untreated silica powder.

Three materials were used in the measurements described below:

A. Davisil Silica, 10 (grain size), 100 A (pore size), Lot #SMR-1-929 (Amicon Corp., Lexington, Mass., USA)(a commercially available silica gel), without further treatment.

B. The same material treated according to the precipitation procedure given in U.S. Pat. No. 4,178,270. The procedure followed Example 3 in U.S. Pat. No. 4,178,270, except that the quantity of powder prepared was only 3 g (instead of 20 g). In the present experiment, a quantity of 0.92 g of zirconium tetrachloride ($ZrCl_4$, cat. no. 87974, lot no. 051784, Alfa Products, Danvers, Mass., USA) was dissolved in a volume of 200 mL of concentrated hydrochloride acid. A volume of 150 mL of this solution was added to a quantity of 3 g of Amicon Corp. Davisil Silica (Material A) and left to stand for 24 hours. Then the supernatant solution was discarded and the powder was brought in contact with water adjusted to pH 5.5 with dilute hydrochloric acid and left to stand for 24 hours. The supernatant solution was discarded and the powder was rinsed with de-ionized water and then air-dried.

C. The same material treated according to the procedure given in Example 2 above. A column of 20 mL of 1000 ppm aluminum reference solution (cat. no. SO-A-442, lot no. 721078, Fisher Scientific Co., Chemical Manufacturing Div., Fair Lawn, N.J., USA, certified atomic absorption standard solution, prepared by dissolving aluminum metal in dilute hydrochloride acid) was mixed with a volume of 24 mL of a pH 7 buffer solution (cat. no. SB-108, Fisher Scientific Co.) in a 1-liter flask. De-ionized water was added to fill the flask almost to the 1-liter mark, and then the pH was adjusted to 5 by means of dropwise addition of an aqueous 50% w/w sodium hydroxide solution (cat. no. SS-410, Fisher Scientific Co.). A volume of 375 mL of the resulting solution was rolled in a plastic bottle with 2.5 g of Amicon Corp. Davisil silica (Material A) for 18 hours. The powder was allowed to settle, the supernatant solution was discarded and the powder rinsed 4 times with de-ionized water and airdried. The alumina content of Material C, measured using a double nitric acid extraction procedure, was (0.5 g±0.04)%.

Each of the three materials described above was used to pack a 250-mm×4.6-mm stainless steel column (cat. no. H5182, The Anspec Co., Ann Arbor, Mich., USA) by means of a stirred slurry column packer (Model 705, Micromeritics Instrument Corp. Norcross, Ga., USA). The slurries were prepared in 2-propanol. It was noted that when the solvent was added to Material B it formed a thick paste and tended to adhere to the walls of the flask in which the slurry was prepared. It was more difficult to prepare a fluid slurry with Material B than with the other two materials. Accordingly, two columns were prepared with Material B and only one with each of the other two materials.

Each of the four packed columns was loaded into a high-pressure liquid chromatograph system (Millipore Corp. Waters Associates, Milford, Mass., USA), consisting of Model 510 HPLC pumps, a Model 680 automated gradient controller, a Model U6K Universal liquid chromatograph injector and a Model 481 LambdaMax LC spectrophotometer. A standard test mixture consisting of a solution of 0.0045% (v/v) benzaldehyde, 0.0225% (v/v) toluene and 0.00227% (w/v) 1,3-dinitrobenzene in a mixture of 100:1 hexane-methanol was prepared. Each column was conditioned by passing through it a pure 100:1 (v/v) hexane-methanol mixture for 1.5–2 hours at a flow rate of 1.0 mL/min and then three consecutive injections of the test mixture were carried out. The chromatographic peaks corresponding to the three components of the test mixture were monitored at a wavelength of 254 nm (full-scale range 0.02 absorbance units) and recorded on a Model 70-700 recorder (Gow-Mac Instrument Co., Bridgewater, N.J., USA) operated at a chart speed of 1.0 cm/min. The results of the three runs on each column were averaged, and the resulting values are given in Table I below. This Table lists the column efficiency $N = 5.54 \, (V_r/W_h)^2$ obtained for each of the components of the mixture with each of the various columns tested, where $V_r$ is the retention volume for the peak corresponding to a particular component in scale units and $W_h$ is the peak width at half-height expressed in the same units (Waters Sourcebook for Chromatography Columns and Supplies, Millipore Corporation, Waters Chromatography Division, Milford, Mass., USA, 1985; C. Horvath, Columns for Gas Chromatography in the Practice of Gas Chromatography, eds. L. S. Ettre and A. Zlatkis, Wiley-Interscience, New York, N.Y., 1967).

TABLE I

| Column Efficiencies for a Three-Component Mixture with Various Column Materials | | | |
|---|---|---|---|
| Column Material | Benzaldehyde | Toluene | Dinitrobenzene |
| A | 4833 ± 1193 | 2348 ± 278 | 5995 ± 1310 |
| B | 1011 ± 65 | 1052 ± 181 | 930 ± 29 |
| B | 851 ± 108 | 751 ± 49 | 628 ± 16 |
| C | 4816 ± 908 | 2530 ± 366 | 5105 ± 444 |

It can be concluded that the column efficiency of Material C (prepared according to the present sorption procedure) is indistinguishable from that of untreated HPLC grade silica (Material A). On the other hand, the column efficiency of Material B (prepared according to the precipitation procedure described in U.S. Pat. No. 4,178,278) is lower by a factor of approximately 5 compared with that of the other two materials, and therefore Material B is very much less suitable than Material C to serve as a chromatographic support material.

It should be emphasized that U.S. Pat. No. 4,178,270 specifically describes compositions prepared by hydrolyzing a metal salt near a surface of, or impregnated into the pores of, a porous carrier, to form a hydrous metal oxide in a pH range which allows the zeta potentials of the carrier and of the hydrous metal oxide to have opposite polarities to each other. This process provides a method for supporting a large amount of a hydrous metal oxide (at least 5%, typically about 10%) on the porous carrier. The high degree of coverage of the surface of the original support with aggregate or colloidal hydrous oxide particles may cause effective masking of the original active sites, neutralization of the original surface charge, changes in particle geometry due to massive, irregular coating, flocculation of coated particles and even partial clogging of pores. These effects are likely to explain the poor performance (poor flow characteristics as well as poor chromatographic resolution) of the material prepared according to U.S. Pat. No. 4,178,278 (Material B) in the studies detailed above.

On the other hand, the material prepared according to application No. 523,823 (Material C) was produced by sorption of the metal species from an under-saturated solution at a constant pH. This sorption process may involve a discrete molecular reaction of formation of a complex silicate (in the specific example given here, an aluminosilicate). This process results in lower loading levels (below 2%, typically between 0.02% and 0.5%) of the dopant and is likely to preserve particle geometry and reactivity largely intact. This can explain the lack of effect of this treatment on the chromatographic performance of the silica support in the studies detailed above. On the other hand, the small amount of complex silicate produced by this treatment is sufficient to cause a very significant increase in the chemical durability of the support, as demonstrated in Example 5 below.

EXAMPLE 4

This example illustrates the preparation and use of a silica gel chromatographic support coated with an organic stationary phase and treated according to the present invention.

The material used in the studies, designated $C^1$, was prepared according to the following procedure:

Amicon Corp. Davisil Silica (Material A, a commercially available silica gel), was first treated to obtain a loading of a $C_{18}$ organic stationary phase according to a procedure reported by W. E. Hammers, R. H. A. M. Janssen et al in the Journal of Chromatgraphy, 167, 273–289 (1978). A quantity of 5 g of this silica was refluxed with an aqueous 2 M hydrochloric acid solution for 2 hours. The powder was washed with de-ionized water to remove chloride until 1 mL of the used wash water showed no turbidity upon the addition of 1 drop of an aqueous 1% silver nitrate solution. The powder was dried at a temperature of 150° C. under a reduced pressure of 1 torr for 12 hours. The powder was placed in a distillation flask. A volume of 50 mL of dry, freshly distilled tetrahydrofuran (HPLC Grade, cat. no. T-425, Fisher Scientific Co., Chemical Manufacturing Div., Fair Lawn, N.J., USA) was added to the silica powder. The flask was equipped with a condenser, a dripping funnel and inlet for dry nitrogen. A quantity of 5 g of octadecyltrichlorosilane (cat. no. 10,481-7, Aldrich Chemical Co., Milwaukee, Wis., USA) dissolved in 25 mL of tetrahydrofuran was added dropwise into the flask, which was gently swirled throughout the addition. The reaction mixture was refluxed at 50° C. for 8 hours and then allowed to stand overnight at room temperature. The reacted powder was rinsed with tetrahydrofuran, stirred for a few minutes with a mixture of two parts of n-hexane and 1 part of ethanol, allowed to stand in this mixture for 1 hour and finally dried at 100° C. under a reduced pressure of 1 torr for 6 hours.

The resulting material was subsequently treated with an aqueous aluminum solution according to the procedure described for Material C in Example 3. The resulting powder therefore represents a silica-based material subjected to a two-stage treatment which consists of coating with an organic stationary phase followed by protective treatment with a metal ion such as Al.

The chromatographic resolution of Material $C^1$ was tested by loading it onto a column and using this column in HPLC separations. The column, made of stainless steel, had a length of 100 mm (much shorter than the 250-mm length of the columns described in Section 1) and a diameter of 4.6 mm. The packing procedure, the liquid chromatograph and the definition of column efficiency are detailed in Section 1 above. The solvent used in the present case was a 1:1 (v/v) methanol-water mixture. Two test mixtures were used in the experiments. One of them had the same components as those of the mixture described in Section 1 but the concentrations and the solvent were different. This mixture consisted of 0.00175% (v/v) benzaldehyde, 0.0174% (w/v) 1,3-dinitrobenzene and 0.0869% (v/v) toluene in 1:1 methanol-water. The injection volume was 5 microliters. The flow rate was 1 mL/min. The chromatographic efficiencies for the three components were found to be 1180±59, 1406±70 and 1711±86, respectively. (As noted above, the column used in this case was shorter by a factor of 2.5 than each of the columns described in Example 3). The second mixture (based on a standard example given in the Waters Sourcebook for Chromatography cited above) contained 0.133% (v/v) benzyl alcohol, 0.0167% (w/v) 1,2-dimethylphthalate and 0.625% (v/v) benzene in 1:1 methanol water. The injection volume was 5 microliters. The flow rate was 1 mL/min. The chromatographic efficiencies measured for the three components were 1055±53, 1084±54 and 1527±76, respectively.

It has accordingly been concluded that the silica-based chromatographic support prepared by coating with an organic stationary phase followed by treatment with a metal ion such as Al as an embodiment of the present invention is useful in resolving various mixtures of organic components by means of liquid chromatographic techniques.

EXAMPLE 5

This example demonstrates that HPLC columns packed with silica powder treated according to the present invention have a much better high-pH durability than columns packed with untreated silica powder.

The materials used in the measurements described below are Amicon Corp. Davisil Silica (Material A, Example 3, which is a commercially available silica gel), and a powder prepared by treating this silica according to the procedure given for Material C in Example 3 above.

Two HPLC columns were packed with Material A and one with Material C according to the procedures outlined in Example 3. A pH 10.00 buffer solution (cat. no SB-116, potassium carbonate-potassium boratepotassium hydroxide buffer, 0.05 M, pH 10.00 0.02 at 25° C., Fisher Scientific Co., Chemical Manufacturing Div., Fair Lawn, N.J., USA) was used as a test solution. The columns were installed inside a water jacket thermostated at 85° C. The test solution was passed through each column at a constant flow rate of 1 mL/min. In the case of the columns made out of Material A, a pressure rise was observed after 1 minute of operation. The pressure required to flow the solution through the column reached 400 psi in less than 10 minutes and 4000 psi after (30±3) minutes, at which point it became impossible to continue the flow through the column. In the case of the column prepared with Material C, no significant pressure rise (within 50 psi) was observed over a period of 18 hours. Upon emptying the columns, the one previously containing Material C was observed to be clean while the one which contained Material A showed sticking of corroded packing particles.

It can be concluded that Material C column packing (treated by sorption of Al from solution) resists corrosion and clogging and can be used at pH 10 over periods of time which exceed the operational life of untreated HPLC Grade silica (Material A) column packing by more than a factor of 100.

What is claimed is:

1. A process for separating materials by liquid chromatography comprising passing said materials through a chromatographic column packed with the chromatographic support formed from porous glass or silica gel modified by a process comprising treating said porous support with a solution of a metal selected from the group consisting of aluminum, iron, zirconium, titanium, chromium, tin, lanthanum, rare earth, alkaline earth, zinc, hafnium, thorium and gallium to sorb said metal onto the porous support and separating said materials on passage of one or more mobile phases having a pH above about 7.5 or a temperature above about 35° C. through said chromatographic column.

2. The process of claim 1 wherein said materials are selected from the group consisting of amines, amino acids, purines, nucleosides, nucleotides, aminoglycosides, peptides, proteins, nucleic acids and enzymes.

3. The process of claim 1 wherein any of said one or more mobile phases has a pH of about 8 to 10.

* * * * *